March 21, 1967 — C. V. WILHERE — 3,309,838
CAPPING MACHINE
Filed April 17, 1964 — 6 Sheets-Sheet 1
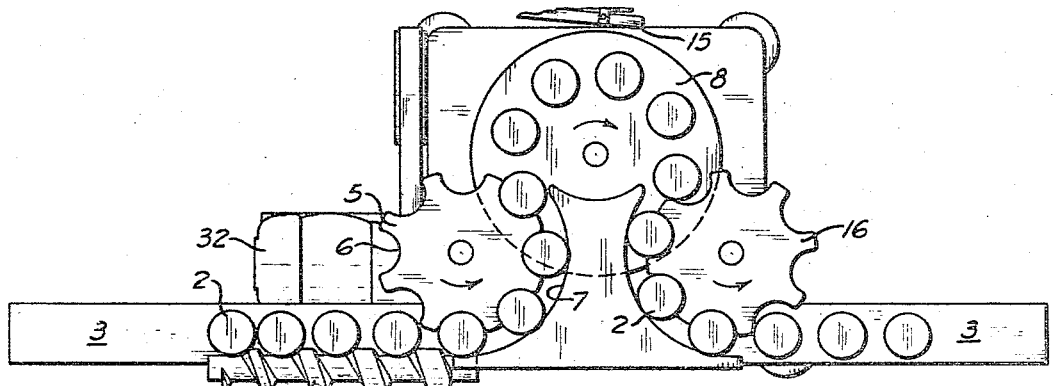
Fig. 2
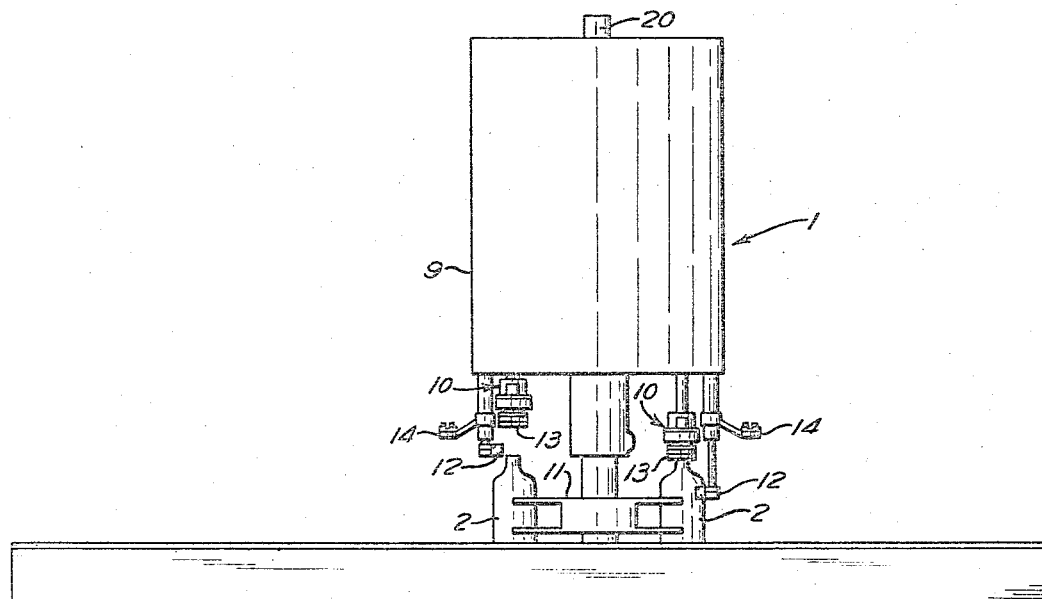
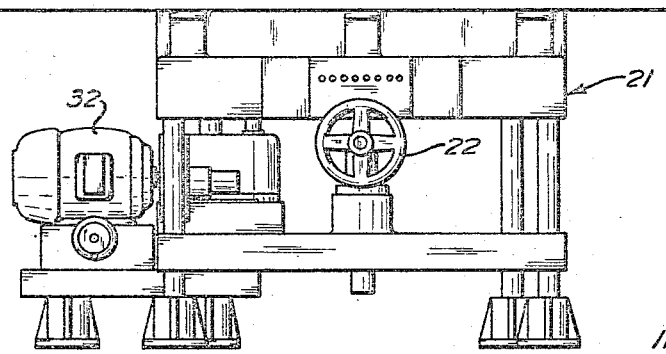
Fig. 1
INVENTOR.
CHARLES V. WILHERE
BY
Brown, Critchlow, Flick & Peckham
ATTORNEYS.

INVENTOR.
CHARLES V. WILHERE
BY
Brown, Critchlow,
Flick & Peckham.
ATTORNEYS.

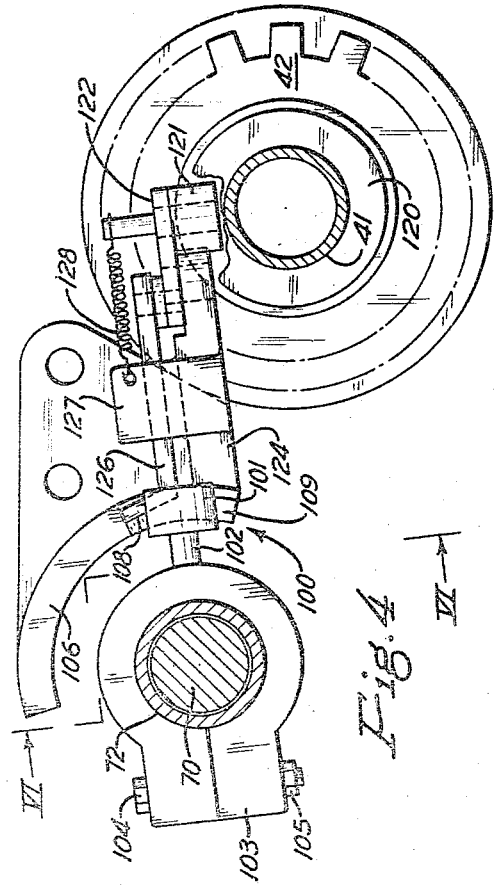
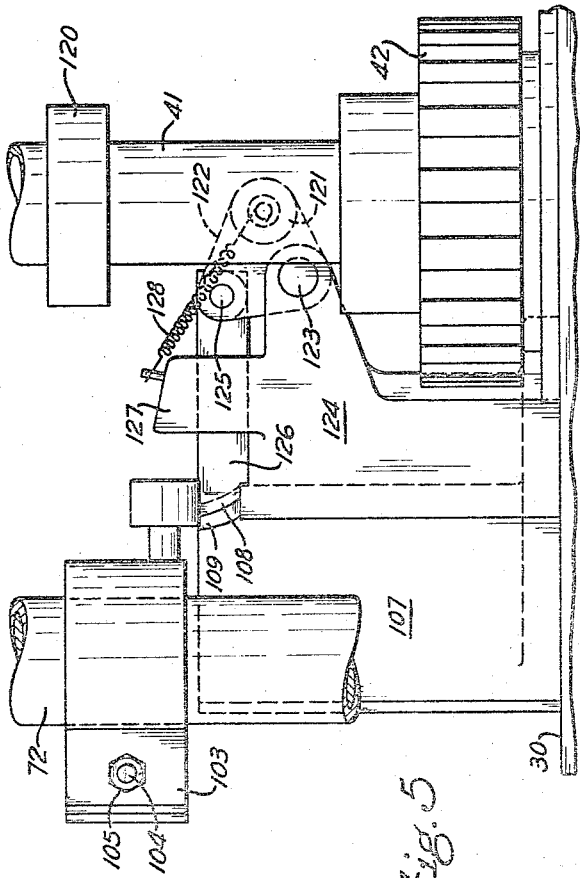
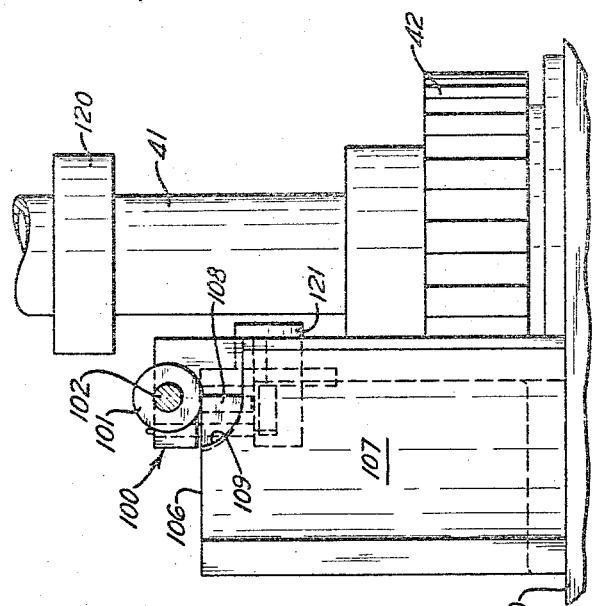
INVENTOR.
CHARLES V. WILHERE
BY
Brown, Critchlow, Flick & Peckham
ATTORNEYS.

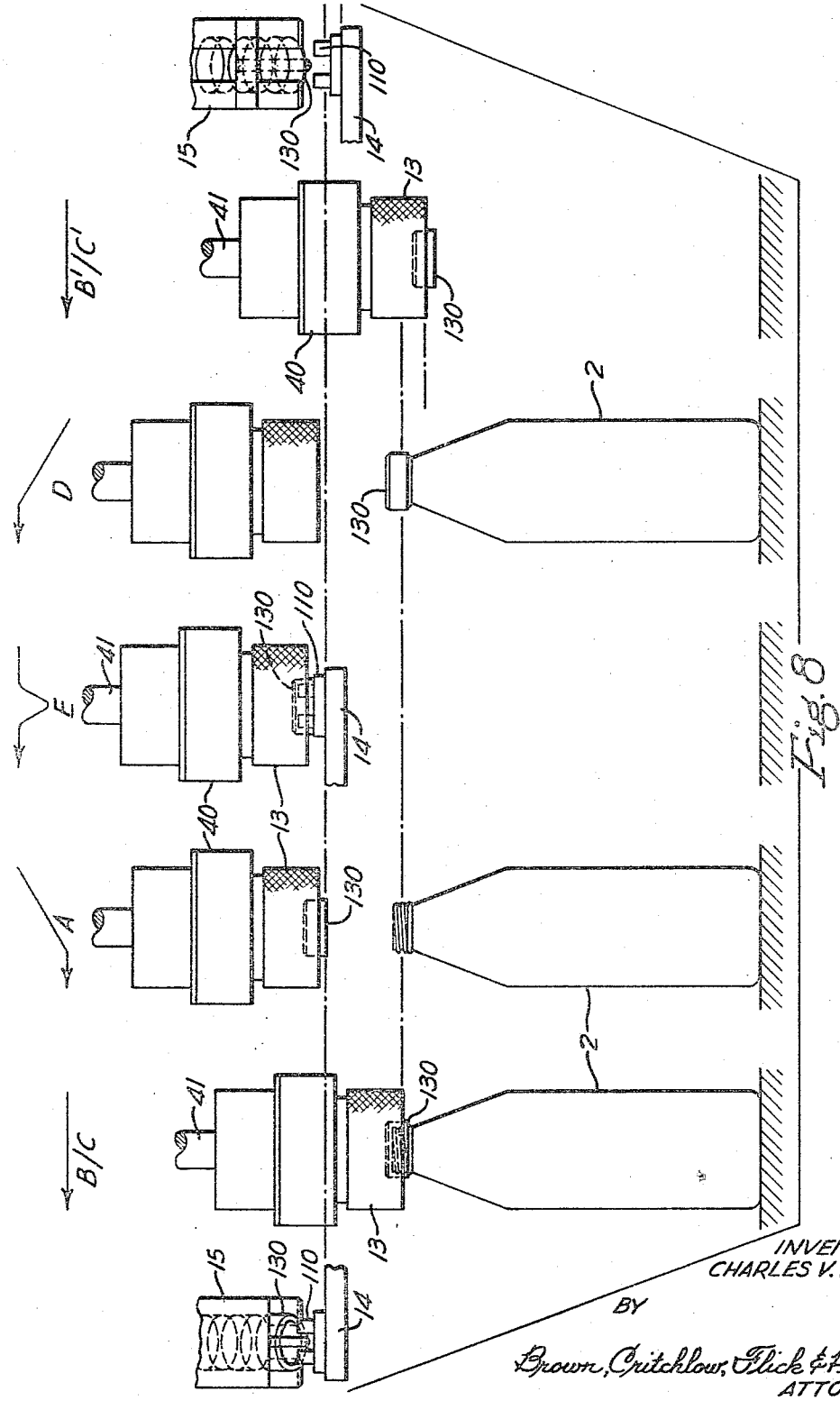

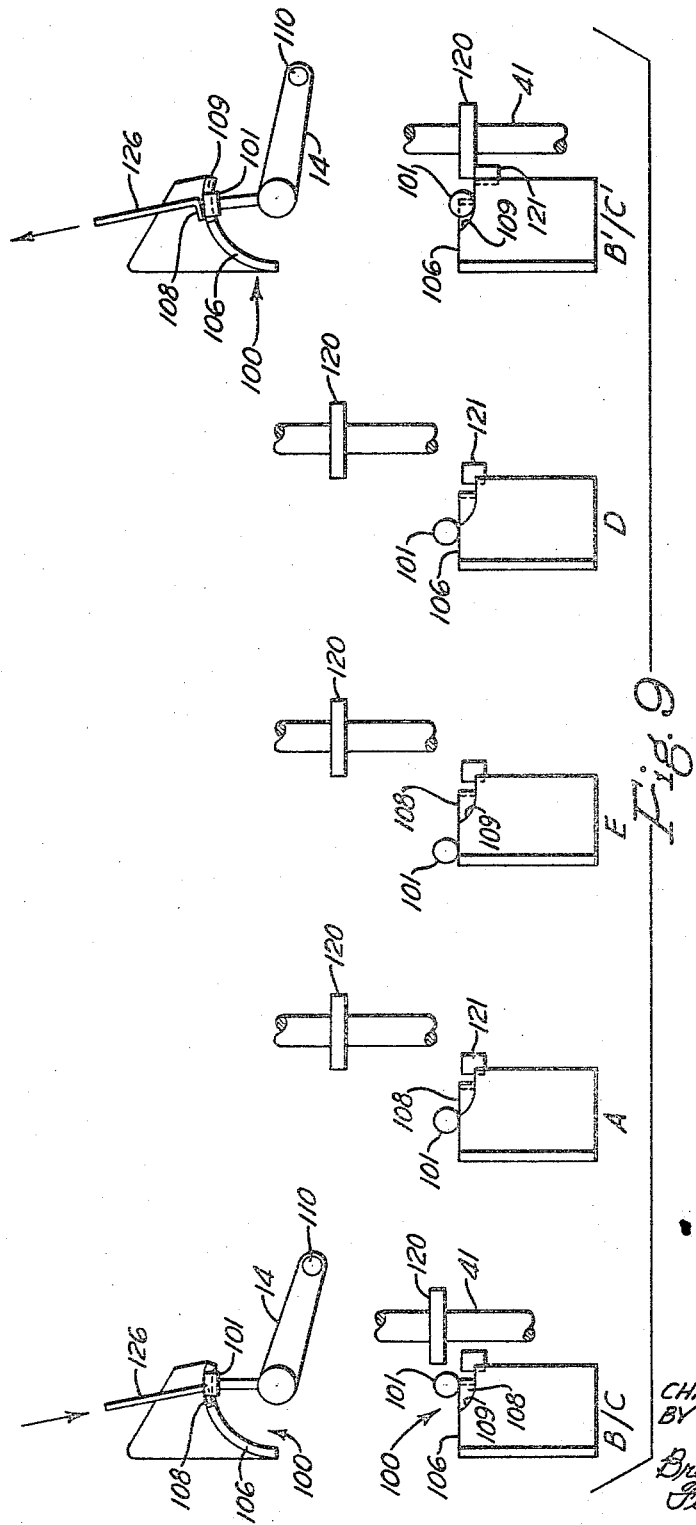

United States Patent Office 3,309,838
Patented Mar. 21, 1967

3,309,838
CAPPING MACHINE
Charles V. Wilhere, Pittsburgh, Pa., assignor to Horix
Manufacturing Company, Pittsburgh, Pa., a corporation of Pennsylvania
Filed Apr. 17, 1964, Ser. No. 360,652
12 Claims. (Cl. 53—67)

This invention relates to a machine for applying caps or closures to containers and, more particularly, to a rotary machine of this type that is adapted to apply caps to a series of containers being continuously fed through the machine.

Conventional machines of this general type have several disadvantages. The principal disadvantage is that, in the event a container is not present at a specific capping station, the cap that would have been applied to such absent container is retained by the capping chuck and, at the same time, a cap transfer mechanism associated with that chuck picks up a new cap and subsequently seeks to insert it in the chuck. Since the chuck already holds an unused cap, the attempted insertion of an extra cap may cause serious malfunctions and, at the very least, will waste caps.

It is, accordingly, among the objectives of this invention to provide a capping machine of the type referred to, in which, in the absence of a container at a particular capping station, the associated cap transfer mechanism will not pick up a new cap for insertion in a capping chuck that is already provided with an unused cap.

Another object is to provide an improved sensing means for determining the presence or absence of a container at a capping station and to provide means responsive to such sensing mechanism for assuring the picking up of a cap from a cap source for insertion in a capping chuck only when a container is present at that particular capping station.

A further object is to provide such a capping machine that includes improved means for holding a container during the capping operation, particularly where the caps are of the type that are screwed on to the container.

Other objects will be apparent from the following description of a preferred embodiment of the invention with reference to the attached drawings, in which FIG. 1 is a front elevation of the capping machine of this invention, showing the general arrangement of the machine;

FIG. 2 is a somewhat diagrammatic and fragmentary plan view of the machine shown in FIG. 1 and, in addition, showing the infeed and outfeed to the machine;

FIG. 4 is a fragmentary plan view, still further enlarged and partly in section, of the cam assembly for controlling the elevation of the cap transfer mechanism so that such mechanism will or will not pick up a cap from a cap source;

FIG. 5 is a front elevation of the cam assembly shown in FIG. 4;

FIG. 6 is a side elevation, partly in section, along the line VI—VI of FIG. 4;

Figure 3:
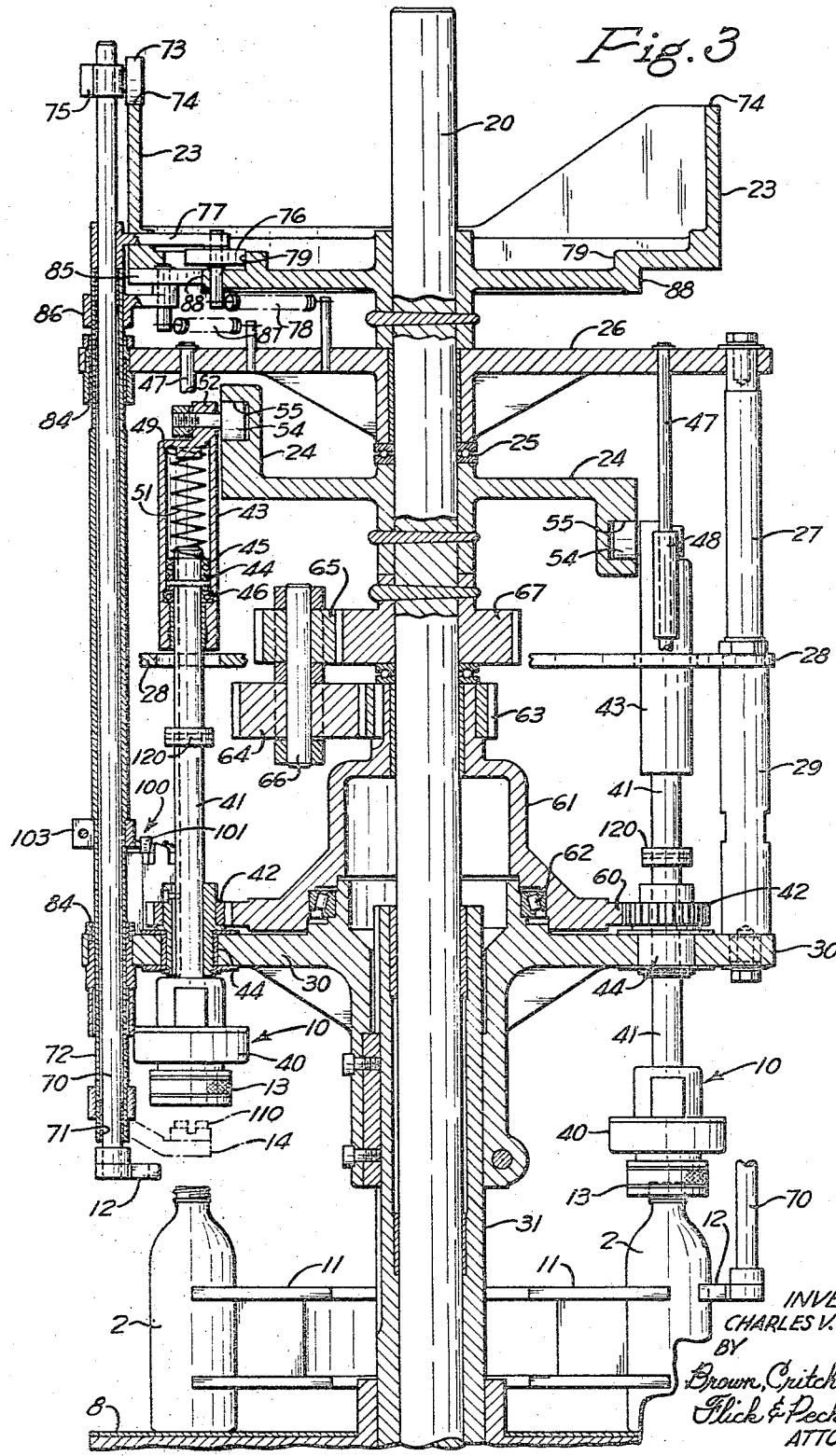
FIG. 3 is an enlarged fragmentary elevation, partly in section, of the machine shown in FIG. 2.

FIG. 8 is a fragmentary diagrammatic elevation of the capping machine, showing the vertical position of the capping chuck for each of its angular positions in FIG. 7, in some cases in the presence and in other cases in the absence of a container, and also showing the different vertical positions of the chuck and cap transfer arm when the chuck senses, in one case, the presence and, in the other case, the absence of a container below it; and FIG. 9 is a series of diagrammatic elevation and plan views of the cam assembly shown in FIGS. 4–6, indicating the relative positions of its parts for each of the angular positions of the capping chuck in FIG. 7.

The capping machine that includes the present invention comprises a rotary turret and a plurality of vertically reciprocable capping spindles mounted on the turret. Means are provided for feeding containers successively onto the turret and for positioning each container in cap-receiving alignment with a capping spindle and its associated chuck. A cap transfer arm, also associated with each spindle and chuck is adapted to pick up a cap from a cap source and transfer it to the chuck for application to a container. There are sensing means for determining the presence or absence of a container beneath each capping spindle during the capping cycle; and cam means responsive to this sensing means control the transfer arm, so that the latter wilul pick up a cap from the cap source only in response to the presence of a container beneath its associated spindle and chuck.

Referring to FIGS. 1 and 2, the capping machine is indicated generally by the numeral 1. It is a rotary type machine adapted to apply screw on caps to a series of containers 2, which are successively fed into and discharged from the machine. The containers move transversely in front of the machine on a conveyor 3. A feed screw 4 separates the containers by the desired interval and feeds them at the proper rate into a feed star wheel 5, the containers fitting between pockets 6 of the star wheel and a guide rail 7. The star wheel delivers the containers to a table 8 of a continuously revolving turret 9 and, in doing so, positions each container in proper vertical alignment beneath a separate capping spindle 10. As each container is carried on table 8 around the vertical axis of the turret, it is held in its aligned position by a back-up guide 11 and a movable gripper arm 12. During this capping cycle, the spindle directly above the container moves downwards, and a chuck 13, mounted on the lower end of the spindle, applies a cap to the container. During this capping operation, a cap transfer arm 14 (there being one arm associated with each spindle) swings outward to pick up a cap from a cap dispensing chute 15. At the end of the cycle, the capping spindle moves upwards and the container is released by the gripper arm and delivered to a discharge star wheel 16, which returns the container to conveyor 3. After the container is discharged from the turret, the cap transfer arm swings under its associated chuck, the spindle and chuck are momentarily lowered, and a new cap is inserted in the chuck for application to a container in the next cycle.

The capping machine is shown in more detail in FIG. 3. It includes a central column 20, which is slidably, but non-rotatably, mounted in the base 21 of the machine, so that it can be adjusted upwards or downwards therein through conventional means (not shown) by turning a handwheel 22 (see FIG. 1). Rigidly connected to this column near its upper end are spaced cam members 23 and 24, each having at least one cam track as subsequently explained. Between those two members, the column rotatably supports on bearings 25 an upper flange member 26, forming the upper part of rotating turret 9. Connected to this upper flange by spacing members 27 is a midplate member 28; and the latter is connected in turn by spacing members 29 to a bottom flange member 30. This last member is fastened to a drive sleeve 31, which is rotatably mounted on column 20. This drive sleeve supports table 8. An electric motor 32 (see FIG. 1) is connected to the drive sleeve through conventional reduction gearing (not shown) for rotating turret 9 at the desired speed.

The capping spindles 10 are rotatably and slidably mounted in turret 9; and, as previously indicated, each spindle has a conventional capping chuck 13 mounted on its lower end. The function of the chuck is to receive and hold a cap and to apply the cap to a container, in this case by threading it on the container (see FIG. 8). A typical chuck would include an expansion ring to receive and hold the cap and a friction disk to develop torque on the top surface of the cap proportional to the vertical pressure applied. None of these parts are shown, since they are conventional and form no part of this invention. Each spindle also includes a clutch member 40, a drive sleeve 41, a drive pinion 42 slidably keyed on the drive sleeve, and a spindle carrier 43. The spindle carrier slidably receives the upper end of the drive sleeve, including a piston member 44 secured to the sleeve and a bearing 45 supported on the piston member. A separate bearing 46 mounted in the lower end of the spindle carrier, slidably supports drive sleeve 41 and retains the upper end of that sleeve within the carrier. Each spindle carrier is free to move vertically on a pair of guide rods 47, which are slidably received in two guide sleeves 48 on opposite sides of the spindle carrier and have their ends secured to upper flange member 26 and midplate member 28. Within the spindle carrier, between bearing 46 and a support member 49, extends a coil spring 51. On the upper end of the spindle carrier is mounted a bracket 52, which rotatably supports a follower 54 that rides in a grooved cam track 55 in fixed cam member 24. As a result of the foregoing arrangement of elements, each of the spindle carriers 43 moves upwards and downwards, in response to the configuration of cam track 55, as turret 9 revolves about column 20; and, in so doing, each spindle carrier yieldingly urges its associated drive sleeve 41 and the elements mounted on the lower end of that sleeve to move in the same direction.

In addition, each of the spindles revolves around its own axis. This is accomplished through a planetary gear system that is responsive to the rotation of turret 9 around column 20. The planetary gear system includes a gear 60 on the lower edge of a floating member 61 that rotates on bearings 62 about column 20. This gear 60 meshes with each of the spindle drive pinions 42. On the upper edge of this same member 61 is mounted a pinion 63 that meshes with the lower of two spur gears 64 and 65, which are rotatably mounted on the same shaft 66. This shaft is secured by suitable means (not shown) to the midplate member 28 which rotates about column 20. The upper spur gear 65 meshes, in turn, with a fixed gear 67 that is rigidly secured to column 20. It will be apparent that the gear train just described will cause the various spindles 10 to revolve in a clockwise direction (looking down from above) when turret 9 revolves in that same direction.

Associated with each spindle 10 is a reciprocable and rotatable gripper arm 12. Each gripper arm is rigidly mounted on the lower end of a separate rod 70, which is slidably and rotatably supported by bearings 71 inside a sleeve member 72. Each rod 70 moves up and down within its sleeve in response to the movement of a follower 73. The latter rides on a cam track 74 that is part of fixed cam member 23. Follower 73 is rotatably mounted on a bracket 75, which is in turn adjustably mounted on rod 70, as by a set screw (not shown), to permit the gripper arm 12 to be set at different heights to accommodate containers having different body and shoulder heights and conformations. Each rod 70 also turns within its sleeve 72 in response to the movement of a second follower 76 rotatably mounted on the end of an arm 77 that is adjustably secured to rod 70. Follower 76 is urged by a spring 78 against a cam track 79, forming part of cam member 23. The combined rotary and vertical motion imparted to each rod 70 by its followers 73 and 76, as the turret rotates about column 20, results in lowering and turning inward each gripper arm 12 at the beginning of the capping cycle of its associated spindle, thereby to hold a container firmly against the backup guide 11, while a cap is being screwed on the mouth of the container. At the end of the capping operation, each gripper arm swings away from the container and moves upward, freeing the container for delivery to the discharge star wheel 16 (see FIG. 2).

Sleeves 72 are also rotatably and slidably supported on turret 9 in appropriate bearings 84 secured to the upper and lower flange members 26 and 30. On each sleeve is mounted a cap transfer arm 14, which is adapted, as the turret revolves, to swing out and pick up a cap from a cap source 15 at the back of the machine (see FIG. 2) and at the front of the machine, between the discharge point of one container and the entry point of another, to swing under its associated chuck, which then descends to pick up the cap from the cap transfer arm. These movements are responsive to the motion of a follower 85, rotatably mounted on an arm 86 secured to the upper end of the sleeve and urged by a spring 87 against a cam track 88. This cam track also is part of fixed cam member 23.

An important feature of the present invention is the provision for vertical movement of each cap transfer arm and the means employed to effect that movement in response to the absence of a container in cap-receiving position beneath the adjacent capping chuck during the capping cycle. The rotary motion of each cap transfer arm, as described in the preceding paragraph, normally permits the arm to swing outward from the turret and to pick up a cap from the cap dispensing source. In accordance with this invention, when a container is not present at the capping station, the cap transfer arm is lowered so that, when it swings outward, it will pass beneath the cap source and fail to pick up a cap. The means for lowering the transfer arm will now be described.

As previously indicated, each of the sleeves 72, on which a cap transfer arm is mounted, is slidably received in bearings on the upper and lower flange members 26 and 27 of the turret. Each sleeve is supported at a normal elevation (at which it can pick up a cap from the cap source) by a cam assembly generally indicated by the numeral 100. This assembly includes a follower 101 that is rotatably supported on a shaft 102 mounted on a slit collar 103 that is clamped by a bolt 104 and a nut 105 to the outside of sleeve 72. Follower 101, like the other followers that have been referred to herein, is preferably in the form of a roller; it rides on an arcuate cam track 106, which is mounted on a cam block 107 supported on lower flange member 30. Cam track 106 has an arcuate extent that is sufficient to support the follower 101 through the maximum turning angle of sleeve 72, as controlled by follower 85 and cam track 88 at the upper end of that sleeve. When transfer arm 14 is in its outermost position, in which it normally picks up a cap from the cap source, sleeve 72 will be turned so that follower 101 is supported at one end of cam track 106. This end is provided with a retractable cam insert 108. When this insert is in its normal position, cam track 106 presents to follower 101 an effectively unbroken cam surface that is substantially horizontal. When insert 108 is retracted from the cam track, as hereinafter explained, the contour of track 106 is altered at that end. As shown in FIG. 6, the contour of the cam surface 109, underlying cam insert 108, curves abruptly downward from cam track 106 in a concave curvature corresponding approximately to an inner cylindrical surface. Accordingly, when cam insert 108 is retracted, follower 101 will roll along the horizontal portion of cam track 106 and then along the downwardly concave portion 109. Since sleeve 72 is wholly supported by follower 101, the sleeve will move downward when the follower begins to ride on track 109, and transfer arm 14 will move downward also.

By the time follower 101 approaches the outer end of track 109 (coincident with transfer arm 14 reaching the outermost portion of its swing from the turret 9), its downward movement is sufficient to assure that button 110 on the end of transfer arm 14 will be below the level of the cap in cap dispenser 15 and will be unable to remove a cap therefrom.

The retraction of cam insert 108 from its normal position on cam block 107 is responsive to means that sense the absence of a container at the capping station. This sensing means is incorporated in the capping spindle 10. It includes a collar 120 secured to drive sleeve 41 of the spindle at a point above the cam assembly 100. If a container is present at the capping station, the downward movement of spindle 10 will be arrested by the engagement of chuck 13 (or the cap within that chuck) and the top of the container, as shown, for example, on the right hand side of FIG. 3. The chuck there exerts downward pressure on the cap (not shown) and on the container by the compression of coil spring 51 at the upper end of the drive sleeve. This pressure helps the chuck to provide the necessary torque to the cap for screwing it on the container. However, if a container is not present at the capping station, spindle 10 will, under the urging of spring 51, tend to descend lower than when a container is present. In such case, collar 120 will engage a roller 121, on lever member 122, the latter being pivotally mounted by a pin 123 on a bracket extension 124 of cam block 107 and pivotally connected by a pin 125 to one end of a bar 126. The other end of bar 126 is secured to cam insert 108, and the bar itself is slidably mounted in a bracket 127 on extension 123. A tension spring 128, normally holds roller 121 in its raised position to maintain cam insert 108 as a normal part of cam track 106 and to restore the insert to its normal position after collar 120 has moved upwards out of engagement with roller 121.

Figure 7:
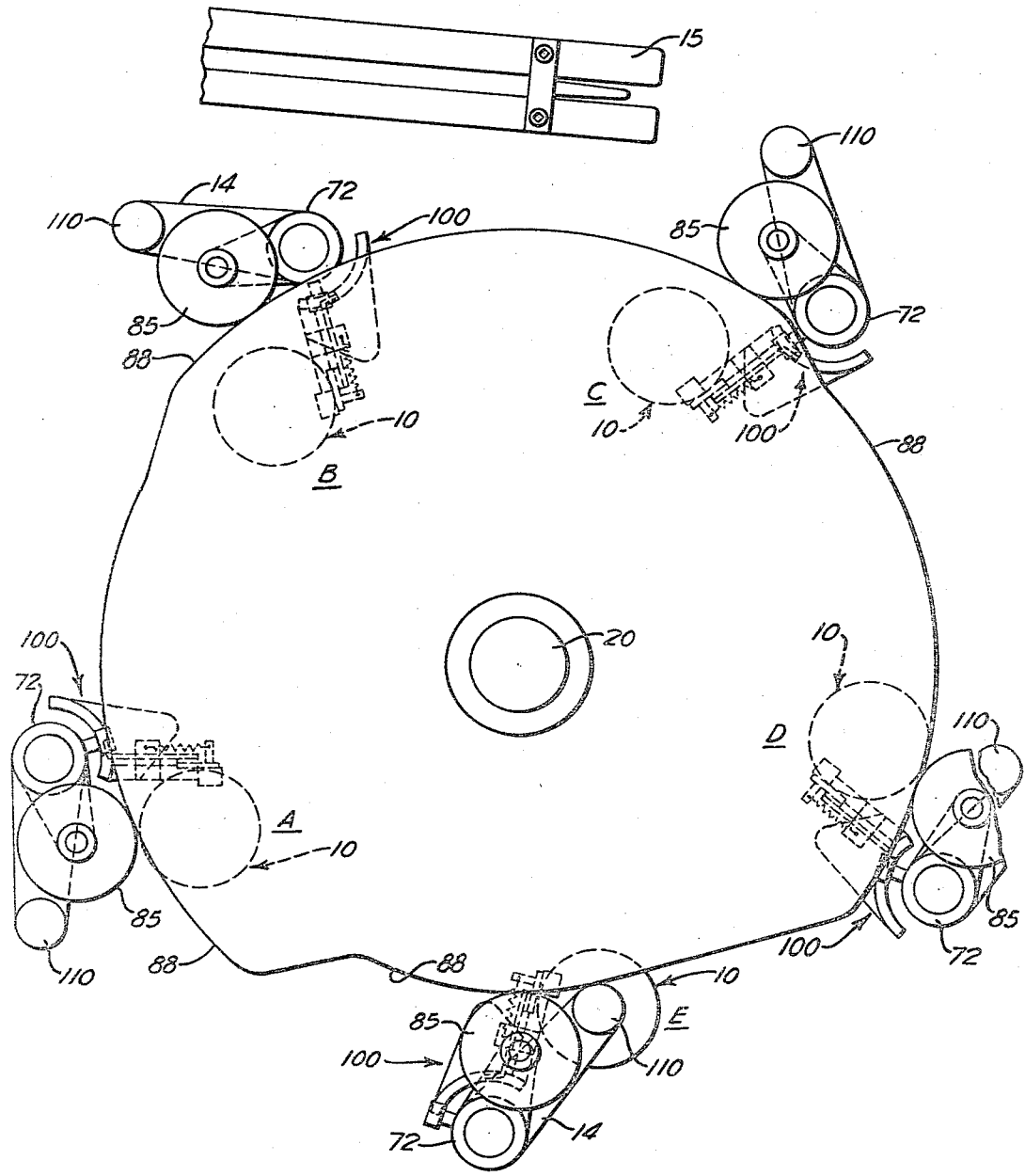
FIG. 7 is a diagrammatic plan view of the cam means for controlling the angular disposition of the cap transfer arm, showing the attitude of that arm in each of five successive angular positions of its associated capping chuck during a complete revolution of that chuck about the vertical axis of the capping machine.

Referring to FIGS. 7–9, the operation of the capping machine will be explained for one complete cycle, both in the presence and in the absence of a container at a particular capping station. These figures show the positions of various critical parts of the machine for each of five successive angular positions or stations of one of the spindles 10, which are identified by the letters A through E. Since there is complete equivalence at stations B and C in the height of the spindle, in the angular attitude of the cap transfer arm, and in the disposition of the parts of cam assembly 100, depending only upon the presence or absence of a container at both stations, those stations have been combined in FIGS. 7 and 8 as follows: (1) the extreme left hand station has been identified by the dual symbol B/C, showing the relation of the elements at both stations B and C in the presence of a container; and (2) the extreme right hand station has been identified by the dual symbol B'/C', showing the relation of the elements at both stations B and C in the absence of a container.

Considering first the operation of the capper when a container is present during the capping cycle, the spindle at station A is in alignment with a container that has just entered the turret from star wheel 5 (see FIGS. 1 and 8); chuck 13 is at its normal elevation, holding a cap 130 to be applied to the container directly below it (see FIG. 8); and, in cam assembly 100 (see FIG. 9), follower 101 is not yet over cam insert 108. The turret is assumed to be turning in a clockwise direction, so that follower 85 will roll in that same direction around the cam track 88. Just before the spindle reaches station B (see FIG. 7), cam track 88 bulges outwardly, causing cap transfer arm 14 and its button 110 to swing to its outermost position. While moving from station A to station B, the spindle descends into capping position under the urging of spring 51 and in response to the movement of cam follower 54 in cam track 55 (see FIG. 3). Further descent of the spindle is arrested by the engagement of chuck 13 with the top of the container; and, by the time the spindle has reached station B, the cap will have been wholly or partly screwed onto the container (see station B/C of FIG. 8). Also by the time the spindle has reached station B, follower 101 in cam assembly 100 will have moved onto cam insert 108 (see station B/C of FIG. 9), thereby maintaining the cap transfer arm 14 at its normal height that will enable it to pick up a cap from the cap dispenser 15 as the spindle moves from station B to station C (see station B/C of FIG. 8). During this same interval, the chuck applies a final tightening torque to the cap. As the spindle leaves station C, it rises above the capped container and transfer arm 14 swings slightly inward, so that follower 101 is no longer on cam insert 108. When the spindle has reached station D, the various elements here under discussion are in the same relative positions shown at station A, and the capped container is about to be delivered to discharge star wheel 16, which will remove the container from the turret. Finally, as the spindle approaches station E, the contour of cam track 88 undergoes an abrupt change that causes transfer arm 14 to swing to its innermost position with its button 110 directly below the chuck 13 of the spindle (see FIG. 7). At the same time, the spindle is moving downwards, and at station E the cap on button 110 of the transfer arm is inserted into and retained by chuck 13 (see FIG. 8). As the turret continues to revolve, the spindle once again reaches station A with a cap held in its chuck, ready for application to the next container positioned below it.

In the absence of a container beneath the capping spindle during the capping cycle, the relationship of the parts, as shown in FIG. 7, will be no different from what has just been described when a container was present. There will be a difference, however, in the disposition of the parts shown in FIGS. 8 and 9. As the spindle approaches station B and descends to engage a container, but finds that no container is present, it will continue its descent until collar 120 on spindle drive shaft 41 has tripped the lever mechanism 122 and retracted cam insert 108 from cam track 106. Accordingly, by the time the spindle has reached station B, the capping chuck (with a cap still in it) will be in the position shown at station B'/C' in FIG. 8, and cam follower 101 will be in the position shown at that same station in FIG. 9. These parts will maintain those same relative positions while the spindle moves from station B to station C, with the result that transfer arm 14 will have been lowered sufficiently by the removal of cam insert 108 that it will pass too far below the cap dispenser source 15 to pick a cap therefrom. Accordingly, when the spindle reaches station C, chuck 13 will still retain the cap received at the end of the previous cycle and button 110 will have no cap on it. At station E, although the transfer arm swings under the spindle, there is no cap on the button of that arm for insertion in the chuck, and the cap already held in that chuck is available for application to a container during the following cycle.

It is among the advantages of this invention that each capping spindle is armed with a cap for application to a container only if a container was present in cap-receiving alignment with that spindle during the immediately preceding capping cycle. This result is obtained by using the capping spindle as a sensing means to determine the presence or absence of a container below it and by controlling the elevation of the cap transfer arm in response to the operation of this sensing means, so that the transfer arm is rendered incapable of picking up a cap from the cap source in the absence of a container below its associated spindle.

Although the present invention has been described in connection with a machine for screwing the cap on containers, it should be understood that the principle of the invention is equally applicable to machines that merely press a cap or other closure on a container where it is held by frictional engagement or other means.

Another advantage of the present invention resides in the improved means herein described for gripping each container during the capping cycle. Gripper arm 12 moves up and down to permit the entry and discharge of containers to and from the turret; it also swings horizontally in and out to grip and release a container in cooperation with back-up guides 11. Both the vertical and swinging movements of the gripper arm are accomplished by separate cam means responsive to the rotation of the turret.

According to the provisions of the Patent Statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a machine of the type described, having a rotary turret and a plurality of vertically reciprocable spindles mounted on the turret and means for feeding containers successively onto the turret and for positioning each container in closure receiving alignment with a spindle and a source of closures adjacent the periphery of the turret and a transfer arm associated with each spindle for normally picking up a closure from the source and transferring it to the spindle for application to a container, means for assuring the pick up of a closure by each transfer arm only in response to the presence of a container in closure receiving alignment with the spindle associated with that arm, said means comprising: sensing means operable solely in response to downward movement of the spindle for determining the presence or absence of a container in closure receiving alignment with said spindle, and cam means responsive to such sensing means for preventing the transfer arm from picking up a closure from said source in the absence of such a container.

2. Apparatus according to claim 1, in which said sensing means includes tripping means mounted on the spindle for actuating said cam means only when the spindle moves downwards below its normal capping elevation in the absence of a container.

3. Apparatus according to claim 1, in which the sensing means includes projecting means mounted on the spindle and in which the cam means includes a cam track and follower for controlling the elevation of the cap transfer arm, the cam track having a retractable insert for altering the contour of the track to cause the transfer arm to descend below a predetermined elevation and lever means for retracting the cam insert and adapted to be actuated by the projecting means on the spindle when the spindle moves downwards below its normal capping elevation in the absence of a container.

4. In a machine of the type described, having a rotary turret and a plurality of vertically reciprocable spindles mounted on the turret, means for feeding containers successively onto the turret and for positioning each container in closure receiving alignment with a spindle and a stationary source of closures adjacent the periphery of the turret and a plurality of horizontally rotatable and vertically reciprocable transfer arms mounted on the turret with a separate transfer arm associated with each spindle for normally picking up a closure from the source and transferring it to the spindle for application to a container, the invention comprising means for controlling the operation of each transfer arm so as to pick up or refrain from picking up a closure from the source in response to the presence or absence, respectively, of a container in closure receiving alignment with the spindle associated with that transfer arm, including means for urging the spindle to move downwards below its normal capping elevation in the absence of a container below the spindle, projecting means mounted on the spindle and movable with it, cam track and follower means supporting the transfer arm and normally limiting its rotation to a given horizontal plane, a retractable cam insert normally included as part of the cam track means, actuating means for retracting this insert from the cam track, thereby to alter the contour of a portion of that track to cause the cam follower on reaching that portion to change the elevation of its suported trasnfer arm to a level that will disable it from picking up a closure from the closure source, said actuating means being actuated to retract the cam insert only when engaged by the projecting means on its associated spindle, said engagement occurring only when the spindle moves downwards below its normal capping elevation.

5. Apparatus according to claim 4, in which the spindles are rotated for applying screw-on closures and in which the projecting means on each spindle is collar rotating with the spindle.

6. Apparatus according to claim 4, in which the transfer arm is adapted to pick up a closure while its associated spindle is applying another closure to a container.

7. Apparatus according to claim 4, in which in the absence of a container, the elevation of the transfer arm is lowered below the level that is effective for picking up a closure from the closure source.

8. Apparatus according to claim 1, that also includes means for gripping a container during the closure applying operation.

9. Apparatus according to claim 8, in which the gripping means includes a separate horizontally swingable and vertically reciprocable gripper arm associated with each spindle, first cam means responsive to the rotation of the turret for elevating the gripper arm above the level of a container during the feeding of the container onto the turret and during its discharge therefrom at the conclusion of the closure applying operation and for lowering the gripper arm to a container-gripping elevation between the feeding and discharge of the container to and from the turret; and second cam means, also responsive to the rotation of the turret, for swinging the gripper arm into lateral engagement with the container to hold the container against the positioning means during the closure applying operation, and for swinging the gripper arm away from the container at the conclusion of that operation prior to the discharge of the container from the turret.

10. Apparatus according to claim 9, in which the gripper arm is mounted coaxially with the closure transfer arm associated with the same spindle.

11. A machine of the type described having a rotary turret and a plurality of vertically reciprocable spindles mounted on the turret and means for feeding containers successively onto the turret and means for positioning each container in closure receiving alignment with a spindle, the invention comprising means for holding each container against said positioning means during the closure applying operation, said holding means including a separate horizontally swingable and vertically reciprocable gripper arm associated with each spindle, first cam means responsive to the rotation of the turret for elevating the gripper arm above the level of a container during the feeding of the container onto the turret and during its discharge therefrom at the conclusion of the closure applying operation and for lowering the gripper arm to a container-gripping elevation between the feeding and discharge of the container to and from the turret; second cam means, also responsive to the rotation of the turret, for swinging the gripper arm into lateral engagement with the container to hold the container against the positioning means during the closure applying operation and for swinging the gripper arm away from the container at the conclusion of that operation prior to the discharge of the container from the turret; and a separate closure transfer arm associated with each spindle and mounted coaxially with the gripper arm associated with the same spindle, said two arms being independently rotatable horizontally and independently reciprocable vertically.

12. Apparatus according to claim 11, in which each transfer arm is mounted on a sleeve supported in the turret and the associated gripper arm is mounted on a rod slidably and rotatably received within the sleeve and extending below the sleeve.

References Cited by the Examiner

UNITED STATES PATENTS

| | | | |
|---|---|---|---|
| 2,842,914 | 7/1958 | Dimond | 53—67 |
| 3,242,632 | 3/1966 | Dimond | 53—67 |

TRAVIS S. McGEHEE, *Primary Examiner.*